United States Patent
Horikoshi et al.

(10) Patent No.: US 8,017,678 B2
(45) Date of Patent: Sep. 13, 2011

(54) POLYESTER RESIN COMPOSITION

(75) Inventors: Takahiro Horikoshi, Saitama (JP);
Kazukiyo Nomura, Saitama (JP);
Naoshi Kawamoto, Saitama (JP); Etsuo Tobita, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/299,915

(22) PCT Filed: Apr. 13, 2007

(86) PCT No.: PCT/JP2007/058152
§ 371 (c)(1),
(2), (4) Date: Feb. 9, 2009

(87) PCT Pub. No.: WO2007/129527
PCT Pub. Date: Nov. 15, 2007

(65) Prior Publication Data
US 2009/0176913 A1 Jul. 9, 2009

(30) Foreign Application Priority Data

May 9, 2006 (JP) ................................. 2006-130567
Jan. 26, 2007 (JP) ................................. 2007-016845

(51) Int. Cl.
*C08J 7/04* (2006.01)

(52) U.S. Cl. ........ 524/168; 524/169; 524/317; 524/378; 524/394; 524/601; 525/437; 525/449

(58) Field of Classification Search .................. 525/437, 525/449; 524/601, 168, 169, 394, 378, 317
See application file for complete search history.

(56) References Cited

U.S. PATENT DOCUMENTS

| | | | |
|---|---|---|---|
| 3,756,997 A | | 9/1973 | Eichers et al. |
| 4,254,015 A * | | 3/1981 | Thomas et al. ............... 524/168 |
| 4,486,560 A * | | 12/1984 | Thomas ........................ 524/100 |
| 4,558,081 A * | | 12/1985 | Thomas ........................ 524/100 |
| 4,727,101 A * | | 2/1988 | Ogoe et al. ...................... 524/83 |
| 4,957,958 A * | | 9/1990 | Schleifstein .................. 524/169 |
| 5,276,077 A * | | 1/1994 | Schwane et al. .............. 524/133 |
| 5,663,280 A * | | 9/1997 | Ogoe et al. .................... 528/196 |
| 5,700,857 A * | | 12/1997 | Mukohyama ................. 524/290 |
| 6,433,050 B1 * | | 8/2002 | Shinomiya et al. ........... 524/265 |
| 6,740,697 B1 * | | 5/2004 | Brenner et al. ............... 524/166 |

FOREIGN PATENT DOCUMENTS

| | | |
|---|---|---|
| JP | 03-002262 A | 1/1991 |
| JP | 03-026751 A | 2/1991 |
| JP | 08-059968 A | 3/1996 |
| JP | 2001-040219 A | 2/2001 |
| JP | 2002-507955 A | 3/2002 |
| JP | 2005-162867 A | 6/2005 |
| JP | 2006-113473 A | 4/2006 |
| WO | 2007095711 A1 | 8/2007 |

OTHER PUBLICATIONS

Database WPI Week 200130 Thomson Scientific, London, GB; AN 2001-285678.
Supplementary European Search Report for European Patent Application No. 07741588 issued on Aug. 6, 2010.

* cited by examiner

*Primary Examiner* — David W Wu
*Assistant Examiner* — Robert Jones, Jr.
(74) *Attorney, Agent, or Firm* — Sughrue Mion, PLLC

(57) ABSTRACT

The present invention provides a polyester resin composition having an excellent crystallization rate.
The polyester resin composition includes (a) a polyester resin containing (b) a sulfonamide compound metal salt which has a structure represented by the following general formula (1):

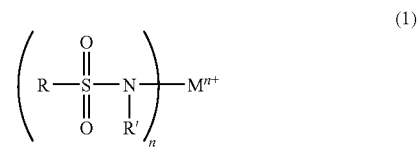

(1)

(in the formula (1), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; n represents a number of 1 or 2).

9 Claims, No Drawings

POLYESTER RESIN COMPOSITION

TECHNICAL FIELD

The present invention relates to a polyester resin composition having a high crystallization rate and excellent moldability.

BACKGROUND ART

Polyester resins such as polyethylene terephthalate, polymethylene terephthalate, polylactic acid, and the like are excellent in heat resistance, chemical resistance, dynamic characteristics, electric characteristics, and the like and also excellent in cost and performance, and are thus widely used as fibers and films in the industrial field. Further, the polyester resins are excellent in gas barrier property, sanitary property, and transparency and are thus widely used for beverage bottles, cosmetic and pharmaceutical containers, detergent and shampoo containers, and the like and further used for electrophotographic toners.

In addition, polyethylene naphthalate is excellent in transparency and excellent in dynamic characteristics and ultraviolet barrier property as compared with polyethylene terephthalate, and particularly has low gas (oxygen, $CO_2$, and water vapor) permeability. Therefore, polyethylene naphthalate is used as films for food packaging, pharmaceutical packaging, APS photographic films, electronic component materials, and the like.

Further, polybutylene terephthalate is excellent in characteristics such as heat resistance, chemical resistance, electric characteristics, dimensional stability, and moldability and is used for automotive electric components, electric and electronic components, and precision components for OA apparatuses.

However, polyester resins generally have extremely low crystallization rates in spite of being crystalline resins, and thus have a very narrow range of molding conditions and difficulty in improving a processing cycle. Therefore, use as molding materials is still restricted. Further, molded products prepared by molding polyester resins have low heat distortion temperatures, and thus there is the problem of limiting operating temperatures.

A generally known method for improving the crystallization rates of polyester resins includes adding a nucleator such as a mineral, an organic acid metal salt, an inorganic salt, a metal oxide, or the like. General-purpose compounds used as the nucleator include metal salts, such as sodium benzoate, aluminum p-tert-butylbenzoate, aromatic phosphate metal salts, and the like; and compounds such as dibenzylidene sorbitol and the like. Further, there is known a method of adding a resin oligomer for improving mobility at a resin processing temperature.

For example, Patent Document 1 proposes a method of adding a metal salt of an abietic acid compound in order to promote the crystallization rate of a polyester resin. Patent Document 2 discloses a method of adding 4-aminobenzenesulfonamide to an olefin resin. Patent Document 3 proposes a method of adding a phosphate metal salt and an aliphatic carboxylic acid metal salt to a crystalline polymer. Patent Document 4 proposes a method using a transition metal salt of a carboxylic acid as a nucleator for a composition containing polyethylene terephthalate and polyethylene naphthalate. Patent Document 5 proposes a method using an alkylene bis fatty acid amide and a quinacridone compound for a polyester of electrophotographic toner.

Patent Document 1: Japanese Unexamined Patent Application Publication No. 08-059968
Patent Document 2: U.S. Pat. No. 3,756,997
Patent Document 3: Japanese Unexamined Patent Application Publication No. 2005-162867
Patent Document 4: Japanese Unexamined Patent Application Publication (translation of PCT Application) No. 2002-507955
Patent Document 5: Japanese Unexamined Patent Application Publication No. 2006-113473

DISCLOSURE OF INVENTION

Problems to be Solved by the Invention

However, the effect of improving the crystallization rate of a polyester resin by adding a generally known additive has not yet been satisfactory. The method of adding a resin oligomer such as ethylene glycol or the like contributes to the crystallization rate of a resin to some extent, but the dynamic strength of the resulting molded product may be decreased. Since an improvement in a molding cycle due to an improvement in a crystallization rate can increase the absolute amount of molded products which can be produced by an existing equipment, the development of a higher-performance nucleator is demanded.

Accordingly, an object of the present invention is to resolve the problem of prior art and provide a polyester resin composition having an excellent crystallization rate.

Means for Solving the Problems

As a result of intensive research, the inventors of the present invention have found that the object can be achieved by the constitution below, leading to the completion of the present invention.

That is, a polyester resin composition of the present invention comprises (a) a polyester resin and (b) a sulfonamide compound metal salt having a structure represented by the following general formula (1):

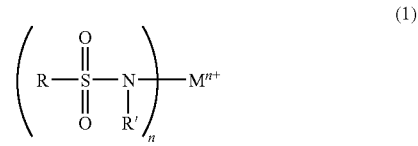

(in the formula (1), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; n represents a number of 1 or 2; when n is 1, M represents an alkali metal atom or $Al(OH)_{3-n}$; and when n is 2, M represents a divalent metal atom (magnesium, calcium, strontium, barium, titanium, manganese, iron, zinc, silicon, zirconium, yttrium, or hafnium), $Al(OH)_{3-n}$, or a linking group (an alkylene group having 1 to 12 carbon atoms, an alkenylene group having 2 to 12 carbon atoms, a cycloalkylene group having 3 to 8 carbon atoms, an alkylene group having an ether bond and 4 to 20 carbon atoms, an alkylene group interrupted by a cycloalkylene group and having 5 to 20 carbon atoms, an arylene group having 6 to 12 carbon atoms, or a combination thereof)).

In the present invention, the sulfonamide compound metal salt (b) in which M in the general formula (1) is an alkali metal atom is preferably used.

In the present invention, a compound represented by any one of general formulae (2) to (7) below can be preferably used as the sulfonamide compound metal salt (b):

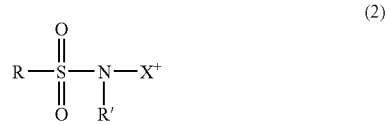

(2)

(in the formula (2), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; and X represents an alkali metal atom).

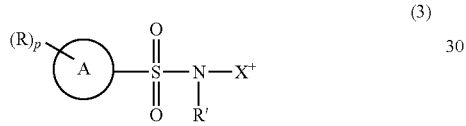

(3)

(in the formula (3), ring A represents a cyclic group having 3 to 30 carbon atoms, R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; X represents an alkali metal atom; p represents an integer of 0 to 3; and when p is an integer of 2 or more, a plurality of R may be different from each other).

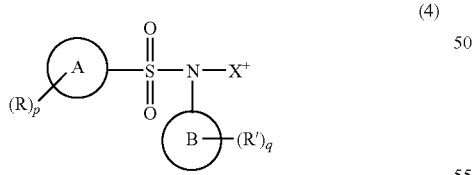

(4)

(in the formula (4), rings A and B each independently represent a cyclic group having 3 to 30 carbon atoms, R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; X represents an alkali metal atom; p represents an integer of 0 to 3; when p is 2 or more, a plurality of R may be different from each other; q represents an integer of 0 to 3; and when q is 2 or more, a plurality of R' may be different from each other).

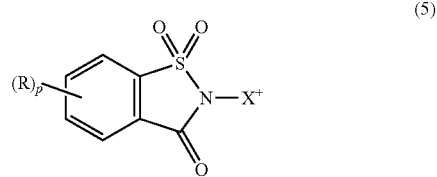

(5)

(in the formula (5), R represents a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; X represents an alkali metal atom; p represents an integer of 0 to 3; and when p is 2 or more, a plurality of R may be different from each other).

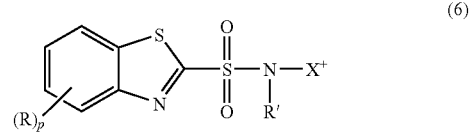

(6)

(in the formula (6), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; X represents an alkali metal atom; p represents an integer of 0 to 3; and when p is 2 or more, a plurality of R may be different from each other)

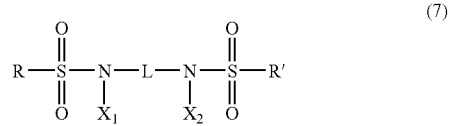

(7)

(in the formula (7), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; $X_1$ and $X_2$ each independently represent an alkali metal atom, and L represents a linking group such as an alkylene group having 1 to 12 carbon atoms, an alkenylene group having 2 to 12 carbon atoms, a cycloalkylene group having 3 to 8 carbon atoms, an alkylene group having an ether bond and 4 to 20 carbon atoms, an alkylene group interrupted by a cycloalkylene group and having 5 to 20 carbon atoms, or an arylene group having 6 to 12 carbon atoms).

In the present invention, the sulfonamide compound metal salt (b) in which M in the general formula (1) is a sodium atom is more preferably used.

In the present invention, as the polyester resin (a), at least one selected from the group consisting of polyethylene terephthalate, polyethylene naphthalate, polytetramethylene terephthalate, polybutylene terephthalate, and polylactic acid can be preferably used.

In the present invention, as the polyester resin (a), particularly, polyethylene terephthalate can be preferably used.

Advantages

According to the present invention, it is possible to realize a polyester resin composition having a high crystallization rate and excellent moldability by mixing a sulfonamide compound metal salt as a nucleator with a polyester resin.

BEST MODE FOR CARRYING OUT THE INVENTION

A polyester resin composition of the present invention will be described in detail below.

A polyester resin used in the polyester resin composition of the present invention is a usual thermoplastic polyester resin and is not particularly limited. Examples of the polyester resin include aromatic polyesters, such as polyethylene terephthalate, polyethylene naphthalate, polybutylene terephthalate, polybutylene naphthalate, polytetramethylene terephthalate, polycyclohexanedimethylene terephthalate, and the like; polyether-ester resins prepared by copolymerizing a polyester constituent and another acid component and/or a glycol component (e.g., an acid component such as isophthalic acid, adipic acid, sebacic acid, glutaric acid, diphenylmethane dicarboxylic acid, dimer acid, or the like and a glycol component such as hexamethylene glycol, bisphenol A, neopentyl glycol alkylene oxide adduct, or the like); degradable aliphatic polyesters, such as polyhydroxybutylate, polycaprolactone, polybutylene succinate, polyethylene succinate, polylactic acid resins, polymalic acid, polyglycolic acid, polydioxanone, poly(2-oxetanone), and the like; and broad polyester resins, such as aromatic polyester/polyether block copolymers, aromatic polyester/polylactone block copolymers, polyarylate, and the like. Among these resins, at least one polyester resin selected from the group consisting of polyethylene terephthalate, polyethylene naphthalate, polytetramethylene terephthalate, polybutylene terephthalate, and polylactic acid is preferably used. In particular, polyethylene terephthalate is preferably used because the advantage of the present invention is significant.

The thermoplastic polyester resin may be a single resin, a blend of a plurality of resins (e.g., a blend of polyethylene terephthalate and polybutylene terephthalate), or a copolymer thereof (e.g., a copolymer of polybutylene terephthalate and polytetramethylene glycol). In particular, a thermoplastic polyester resin having a melting point of 200° C. to 300° C. is preferably used because excellent heat resistance is exhibited.

As a metal of the sulfonamide compound metal salt (b), an alkali metal, an alkaline earth metal, a transition metal, a base metal, a noble metal, a heavy metal, a light metal, a semimetal, a rare metal, and the like can be used. Specific examples of the metal include lithium, sodium, potassium, beryllium, magnesium, calcium, strontium, barium, radium, scandium, titanium, vanadium, chromium, manganese, iron, cobalt, nickel, copper, yttrium, zirconium, niobium, molybdenum, technetium, ruthenium, rhodium, palladium, silver, aluminum, zinc, gold, platinum, iridium, osmium, mercury, cadmium, arsenic, tungsten, tin, bismuth, boron, silicon, germanium, tellurium, polonium, gallium, germanium, rubidium, zirconium, indium, antimony, cesium, hafnium, tantalum, rhenium, and the like. However, a hydroxide of lithium, sodium, potassium, magnesium, calcium, strontium, barium, titanium, manganese, iron, zinc, silicon, zirconium, yttrium, hafnium, or aluminum is preferably used.

Examples of an alkyl group which is represented by R or R' in the above-described general formulae, which has 1 to 10 carbon atoms, and which may be branched or substituted include methyl, ethyl, propyl, isopropyl, butyl, isobutyl, sec-butyl, tert-butyl, amyl, isoamyl, tert-amyl, hexyl, heptyl, octyl, isooctyl, 2-ethylhexyl, tert-octyl, nonyl, decyl, and the like. In these alkyl groups, a given —$CH_2$— may be substituted by —O—, —CO—, —COO—, or —$SiH_2$— and hydrogen atoms may be partially or entirely substituted by a halogen atom such as fluorine, chlorine, bromine, iodine, or the like, or a cyano group.

Examples of an alkoxy group which is represented by R or R' in the above-described general formulae, which has 1 to 10 carbon atoms, and which may be branched or substituted include methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy, decyloxy, and the like. In these alkoxy groups, a given —$CH_2$— may be substituted by —O—, —CO—, —COO—, or —$SiH_2$— and hydrogen atoms may be partially or entirely substituted by a halogen atom such as fluorine, chlorine, bromine, iodine, or the like, or a cyano group.

A cyclic group which is represented by R or R' in the above-described general formulae, which has 3 to 30 carbon atoms, and which may be substituted may be monocyclic, polycyclic, a condensed ring, or a ring of sets and may be either an aromatic cyclic group or a saturated aliphatic cyclic group. A carbon atom in a ring may be substituted by an oxygen atom, a nitrogen atom, a sulfur atom, or the like, and hydrogen atoms of a ring may be partially or entirely substituted by an alkyl group having 1 to 5 carbon atoms or an alkoxy group having 1 to 5 carbon atoms. Examples of such a cyclic group having 3 to 30 carbon atoms include pyrrole, furan, thiophene, imidazole, pyrazole, oxazole, isoxazole, thiazole, isothiazole, pyridine, pyridazine, pyrimidine, pyrazine, piperidine, piperazine, morpholine, phenyl, naphthyl, anthracene, biphenyl, triphenyl, 2-methylphenyl(o-tolyl, cresyl), 3-methylphenyl(m-tolyl), 4-methylphenyl(p-tolyl), 4-chlorophenyl, 4-hydroxyphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl (xylyl), 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, cyclohexylphenyl, 2,4,5-trimethylphenyl (mesityl), 4-aminophenyl, 5-dimethylaminonaphthyl, 6-ethoxy-benzothiazolyl, 2,6-dimethoxy-4-pyrimidyl, 5-methyl-1,3,4-thiadiazol-2-yl, 5-methyl-3-isoxazolyl, and the like.

As an alkali metal atom represented by X, $X_1$, and $X_2$ in the above-described formulae, a lithium atom, a sodium atom, and a potassium atom are used. In particular, a sodium atom is preferably used because the advantage of the present invention is significant.

In the general formula (7), a linking group represented by L is an alkylene group having 1 to 12 carbon atoms, an alkenylene group having 2 to 12 carbon atoms, a cycloalkylene group having 3 to 8 carbon atoms, an alkylene group having an ether bond and a total of 4 to 20 carbon atoms, or an alkylene group interrupted by a cycloalkylene group and having a total of 5 to 20 carbon atoms, an arylene group having 6 to 12 carbon atoms, or a combination thereof. Examples of the alkylene group having 1 to 12 carbon atoms include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, decylene, dodecylene, ethane-1,1-diyl, propane-2,2-diyl, and the like. Examples of an alkenylene group having 2 to 12 carbon atoms include vinylene, 1-methylethenylene, 2-methylethenylene, propenylene, butenylene, isobutenylene, pentenylene, hexenylene, heptenylene, octenylene, decenylene, dodecenylene, and the like. Examples of a cycloalkylene group having 3 to 8 carbon atoms include cyclopropylene, 1,3-cyclobutylene, 1,3-cyclopentylene, 1,4-cyclohexylene, 1,5-cyclooctylene, and the like. Examples of an alkylene group having an ether bond and a total of 4 to 20 carbon atoms include an alkylene group having an ether bond in its carbon chain or a terminal thereof. The alkylene group may have only one ether bond or a plurality of ether bonds connected. Examples of an alkylene group interrupted by a cycloalkylene group and having a total of 5 to 20 carbon atoms include an alkylene group having the cycloalkylene group in its carbon chain or a terminal thereof. Examples of an arylene group having 6 to 12 carbon atoms include aromatic cyclic groups such as 1,4-phenylene, 1,5-naphthalene, 2,6-naphthalene, biphenyl, and the like. The aromatic cyclic groups may be substituted.

In the present invention, particularly, the linking group represented by L in the general formula (7) is preferably methylene, 1,4-phenylene, 1,5-naphthalene, 2,6-naphthalene, biphenyl, or the like.

Preferred examples of the compounds represented by the general formulae (1) to (7) include the following compound Nos. 1 to 20. However, the present invention is not limited to these compounds.

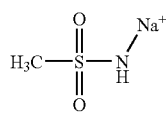

Compound No. 1

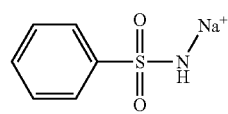

Compound No. 2

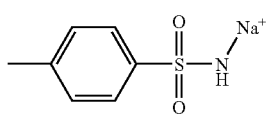

Compound No. 3

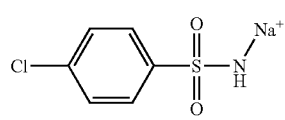

Compound No. 4

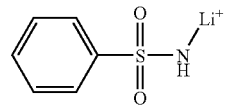

Compound No. 5

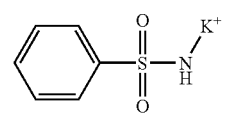

Compound No. 6

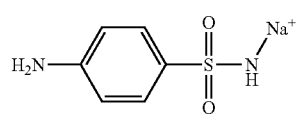

Compound No. 7

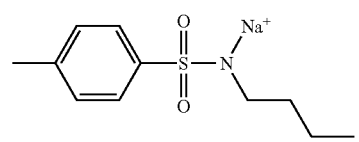

Compound No. 8

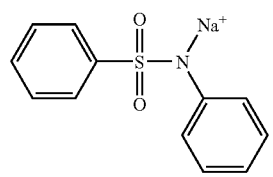

Compound No. 9

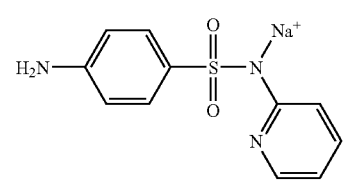

Compound No. 10

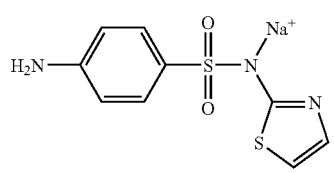

Compound No. 11

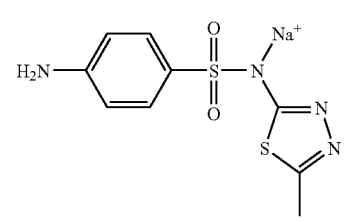

Compound No. 12

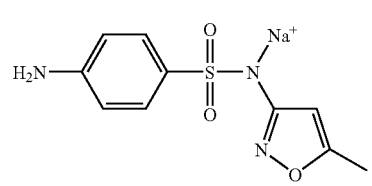

Compound No. 13

-continued

Compound No. 14
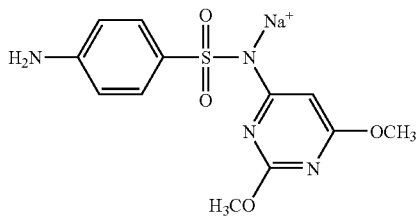

Compound No. 15
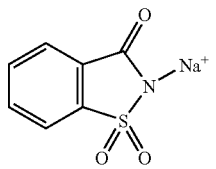

Compound No. 16
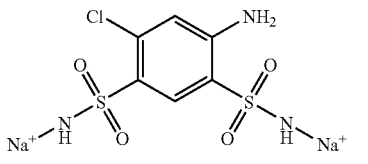

Compound No. 17
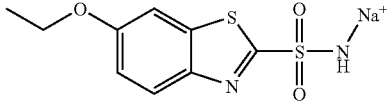

Compound No. 18
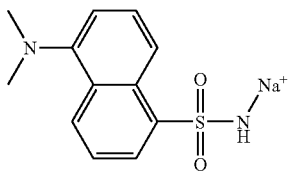

Compound No. 19
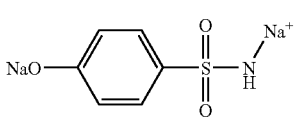

Compound No. 20
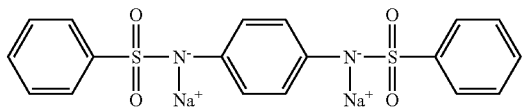

The sulfonamide compound metal salt of the present invention is preferably added in an amount of 0.01 to 10 parts by mass, more preferably 0.05 to 5 parts by mass, and most preferably 0.1 to 3 parts by mass relative to 100 parts by mass of the polyester resin. When the amount is less than 0.01 part by mass, the effect of addition is insufficient, while when the amount exceeds 10 parts by mass, there occurs the phenomenon that the compound appears on a surface of the polyester resin composition.

According to demand, generally used other additives may be added to the polyester resin composition within a range in which the advantage of the present invention is not impaired.

Examples of the other additives include phenolic, phosphoric, and sulfuric antioxidants and the like; light stabilizers such as a hindered amine light stabilizer, an ultraviolet absorber, and the like; lubricants such as hydrocarbons, fatty acids, aliphatic alcohols, aliphatic esters, aliphatic amide compounds, aliphatic carboxylic acid metal salts, other metallic soaps, and the like; heavy metal deactivators; anti-fogging agents; antistatic agents such as a cationic surfactant, an anionic surfactant, a nonionic surfactant, an amphoteric surfactant, and the like; halogen compounds; phosphate compounds; phosphoric acid amide compounds; melamine compounds; fluorocarbon resins or metal oxides; flame retardants; fillers such as glass fibers, calcium carbonate, and the like; pigments; inorganic silicate additives; nucleators; and the like. In particular, phenolic and phosphoric antioxidants are preferably used because of the effect of preventing coloring of the polyester resin composition.

Examples of the phenolic antioxidants include 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, tridecyl.3, 5-di-tert-butyl-4-hydroxybenzyl thioacetate, thiodiethylene bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycol ester, 4,4'-butylidene bis(2,6-di-tert-butylphenol), 4,4'-butylidene bis(6-tert-butyl-3-methylphenol), 2,2'-ethylidene bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethylene glycol bis[β-(3-tert-butyl-4-hydroxy-5-methylphenyl) propionate], and the like.

Examples of the phosphoric antioxidants include triphenyl phosphite, tris(2,4-di-tert-butylphenyl) phosphite, tris(2,5-di-tert-butylphenyl) phosphite, tris(nonylphenyl) phosphite, tris(dinonylphenyl) phosphite, tris(mono/di-mixed nonylphenyl) phosphite, diphenyl acid phosphite, 2,2'-methylene bis(4,6-di-tert-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol).1, 4-cyclohexane dimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra(C12-C15 mixed alkyl)-4,4'-isopropylidenediphenyl phosphite, bis[2,2'-methylenebis (4,6-diamylphenyl) isopropylidenediphenyl phosphite, tetramidecyl.4,4'-butylidenebis(2-tert-butyl-5-methylphenol) diphosphite, hexa(tridecyl).1,1,3-tris(2-methyl-5-tert-butyl-4-hydroxyphenyl)butane.triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepin-6-yl) oxy]ethyl)amine, 9,10-dihydro-9-oxa-10-phosphaphenanthrene-10-oxide, 2-butyl-2-ethylpropanediol-2,4,6-tri-tert-butylphenol monophosphite, and the like.

Examples of the sulfuric antioxidants include dialkyl thiodipropionates such as dilauryl, dimyristyl, myristylstearyl, and distearyl esters of thiodipropionic acid, and the like; and polyol β-alkylmercaptopropionates such as pentaerythritol tetra(β-dodecylmercaptopropionate) and the like.

Examples of the hindered amine light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis (1,2,2,6,6-pentamethyl-4-piperidyl) sebacate, bis(1-octoxy-2,2,6,6-tetramethyl-4-piperidyl) sebacate, 1,2,2,6,6-pentamethyl-4-piperidyl methacrylate, 2,2,6,6-tetramethylpiperidyl methacrylate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).bis(tridecyl)-1,2,3,4-butanetetracarboxylate, bis(1,2,2,6,6-pentamethyl-4-piperidyl).bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 3,9-bis[1,1-dimethyl-2-{tris(2,2,6,6-tetramethyl-4-piperidyloxycarbonyloxy) butylcarbonyloxy}ethyl]-2,4,8,10-tetraoxaspiro[5.5] undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane, 1,6-bis(2,2,6,6-tetramethyl-4-piperidylamino) hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-ylamino] undecane, 1,6,11-tris[2,4-bis(N-butyl-N-(1,2,2,6,6-pentamethyl-4-piperidyl)amino)-s-triazin-6-ylamino] undecane, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, and the like.

Examples of the ultraviolet absorber include 2-hydroxybenzophenones, such as 2,4-dihydroxybenzophenone, 2-hydroxy-4-methoxybenzophenone, 2-hydroxy-4-octoxybenzophenone, 5,5'-methylene bis(2-hydroxy-4-methoxybenzophenone), and the like; 2-(2-hydroxyphenyl) benzotriazoles, such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene bis(4-tert-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, 2-[2-hydroxy-4-(3-methacryloyloxypropyl) phenyl]benzotriazole, and the like; 2-(2-hydroxyphenyl)-4,6-diaryl-1,3,5-triazines, such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12-C13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine, 2,4,6-tris (2-hydroxy-3-methyl-4-hexyloxyphenyl)-1,3,5-triazine, and the like; benzoates, such as phenyl salicylate, resorcinol monobenzoate, 2,4-di-tert-butylphenyl-3,5-di-tert-butyl-4-hydroxybenzoate, octyl (3,5-di-tert-butyl-4-hydroxy)benzoate, dodecyl (3,5-di-tert-butyl-4-hydroxy)benzoate, tetradecyl (3,5-di-tert-butyl-4-hydroxy)benzoate, hexadecyl (3,5-di-tert-butyl-4-hydroxy)benzoate, octadecyl (3,5-di-tert-butyl-4-hydroxy)benzoate, behenyl (3,5-di-tert-butyl-4-hydroxy)benzoate, and the like; substituted oxanilides, such as 2-ethyl-2'-ethoxyoxanilide, 2-ethoxy-4'-dodecyloxanilide, and the like; cyanoacrylates, such as ethyl α-cyano-β,β-diphenylacrylate, methyl-2-cyano-3-methyl-3-(p-methoxyphenyl)acrylate, and the like; and various metal salts or metal chelates, particularly nickel or chromium salts or chelates.

Examples of aliphatic amide compounds used as the lubricant include mono-fatty acid amides, such as lauric acid amide, stearic acid amide, oleic acid amide, erucic acid amide, ricinoleic acid amide, 12-hydroxystearic acid amide, and the like; N,N'-bis-fatty acid amides, such as N,N'-ethylene-bis-lauric acid amide, N,N'-methylene-bis-stearic acid amide, N,N'-ethylene-bis-stearic acid amide, N,N'-ethylene-bis-oleic acid amide, N,N'-ethylene-bis-behenic acid amide, N,N'-ethylene-bis-12-hydroxystearic acid amide, N,N'-butylene-bis-stearic acid amide, N,N'-hexamethylene-bis-stearic acid amide, N,N'-hexamethylene-bis-oleic acid amide, N,N'-xylylene-bis-stearic acid amide, and the like; alkylol amides, such as stearic acid monomethylol amide, palm oil fatty acid monoethanol amide, stearic acid diethanol amide, and the like; N-substituted fatty acid amides, such as N-oleylstearic acid amide, N-oleyloleic acid amide, N-stearylstearic acid amide, N-stearyloleic acid amide, N-oleylpalmitic acid amide, N-stearylerucic acid amide, and the like; and N,N'-substituted dicarboxylic acid amides, such as N,N'-dioleyladipic acid amide, N,N'-distearyladipic acid amide, N,N'-dioleylsebacic acid amide, N,N'-distearylsebacic acid amide, N,N'-distearylterephthalic acid amide, N,N'-distearylisophthalic acid amide, and the like. These compounds may be used alone or as a mixture of two or more.

Examples of the flame retardants include phosphates, such as triphenyl phosphate, phenol/resorcinol/phosphorus oxychloride condensate, phenol/bisphenol A/phosphorus oxychloride condensate, 2,6-xylenol/resorcinol/phosphorus oxychloride condensate, and the like; phosphoric acid amides, such as aniline/phosphorus oxychloride condensate, phenol/xylylenediamine/phosphorus oxychloride condensate, and the like; phosphazene; halogen flame retardants, such as decabromodiphenyl ether, tetrabromobisphenol A, and the like; phosphates of nitrogen-containing organic compounds such as melamine phosphate, piperazine phosphate, melamine pyrophosphate, piperazine pyrophosphate, melamine polyphosphate, piperazine polyphosphate, and the like; red phosphorus and surface-treated and microencapsulated red phosphorus; flame retardant auxiliaries, such as antimony oxide, zinc borate, and the like; anti-dripping agents, such as polytetrafluoroethylene, silicone resin, and the like.

Examples of the inorganic silicate additives include hydrotalcite, fumed silica, fine particle silica, silica rock, diatomites, clay, kaolin, diatomaceous earth, silica gel, calcium silicate, sericite, kaolinite, flint, feldspar powder, vermiculite, attapulgite, talc, mica, minesotite, pyrophyllite, silica, and the like.

Examples of the nucleator include dibenzylidene sorbitol, bis(p-methylbenzylidene) sorbitol, bis(p-ethylbenzylidene) sorbitol, disodium bicyclo[2.2.1]heptane-2,3-dicarboxylate, and the like.

In addition, the method of adding the sulfonamide compound metal salt, specifically the compound represented by any one of the general formulae (1) to (7), and other additives according to demand to the polyester in the polyester resin composition of the present invention is not particularly limited, and a generally known method can be used. For example, a powder or pellets of the polyester resin and compounds may be mixed by dry blending, or the polyester resin may be pre-blended with part of compounds and then dry-blended with the remaining components. After dry blending, the resultant blend may be mixed using a mill roll, a Banbury mixer, a super mixer, or the like and kneaded using a single- or twin-screw extruder or the like. The kneading is generally performed at a temperature of about 200° C. to 350° C. Alternatively, a method of adding compounds in the polymerization step of the polyester resin or a method of preparing a master batch containing high concentrations of compounds and then adding the master batch to the polyester resin can be used.

Like general plastics, the polyester resin composition of the present invention is mainly used as a molding material for various molded products.

In molding the polyester resin composition of the present invention, molding such as extrusion molding, injection molding, blow molding, vacuum molding, compression molding, or the like can be performed in the same manner as general plastics, and various molded products such as sheets, rods, bottles, vessels, and the like can be easily formed.

The polyester resin composition of the present invention may be mixed with glass fibers, carbon fibers, or the like to prepare fiber-reinforced plastic.

EXAMPLES

Although the present invention is described in further detail below with reference to production examples and examples, the present invention is not limited to these examples. The term "production example" represents a method for producing the polyester resin composition of the present invention, and the term "example" represents evaluation of the resultant polyester resin compositions.

Production Example 1

A polyester resin composition prepared by adding 1 part by mass of each of the test compounds shown in Table 1 below to 100 parts by mass of polyethylene terephthalate resin (TR-8550; manufactured by Teijin Chemicals, Ltd.) was mixed. Then, the resultant resin composition was dried under reduced pressure at 140° C. for 3 hours and kneaded with a single-screw extruder (Labo Plastomill μ; Toyo Seiki Seisaku-sho, Ltd.) at a cylinder temperature of 270° C. and a screw speed of 150 rpm to prepare pellets. The resultant pellets were dried at 140° C. for 3 hours and then evaluated as described below.

(Crystallization Temperature)

The resulting pellets were heated to 300° C. at a rate of 50° C./min, maintained for 10 minutes, and then cooled to 100° C. at a rate of −10° C./min in a differential scanning calorimeter (Diamond; Perkin Elmer Inc.) to determine the crystallization temperature. The results are shown in Table 1 below.

(Semi-Crystallization Time)

The resulting pellets were heated to 300° C. at a rate of 50° C./min, maintained for 10 minutes, and then cooled to a predetermined temperature (220° C. to 230° C.) at a rate of −200° C./min in a differential scanning calorimeter (Diamond; Perkin Elmer Inc.). After the predetermined temperature was attained, the temperature was kept for 30 minutes to determine a time required until the quantity of endothermic enthalpy heat reached half the whole heat required for crystallization. The time was considered as the semi-crystallization time. The results are shown in Table 2 below.

TABLE 1

| | Test compound | Crystallization temperature [° C.] |
|---|---|---|
| Example 1-1 | Compound No. 2 | 225.3 |
| Example 1-2 | Compound No. 3 | 225.2 |
| Example 1-3 | Compound No. 7 | 220.9 |
| Example 1-4 | Compound No. 9 | 225.3 |
| Example 1-5 | Compound No. 10 | 223.9 |
| Example 1-6 | Compound No. 12 | 225.1 |
| Example 1-7 | Compound No. 14 | 221.6 |
| Example 1-8 | Compound No. 15 | 222.4 |
| Example 1-9 | Compound No. 16 | 221.4 |
| Example 1-10 | Compound No. 17 | 222.5 |
| Example 1-11 | Compound No. 18 | 221.6 |
| Example 1-12 | Compound No. 19 | 223.3 |
| Example 1-13 | Compound No. 20 | 223.5 |
| Comparative Example 1-1 | Control[1] | 202.4 |
| Comparative Example 1-2 | Comparative compound 1[2] | 205.1 |
| Comparative Example 1-3 | Comparative compound 2[3] | 207.4 |
| Comparative Example 1-4 | Comparative compound 3[4] | 208.1 |
| Comparative Example 1-5 | Comparative compound 4[5] | 213.0 |
| Comparative Example 1-6 | Comparative compound 5[6] | 214.9 |
| Comparative Example 1-7 | Comparative compound 6[7] | 215.4 |
| Comparative Example 1-8 | Comparative compound 7[8] | 218.2 |
| Comparative Example 1-8 | Comparative compound 8[9] | 218.7 |
| Comparative Example 1-9 | Comparative compound 9[10] | 219.7 |
| Comparative Example 1-10 | Comparative compound 10[11] | 220.3 |

[1] Control: not mixed with nucleator
[2] Comparative compound 1: 4-aminobenzenesulfonamide
[3] Comparative compound 2: aluminum hydroxy(di-tert-butylbenzoate)
[4] Comparative compound 3: benzenesulfonamide
[5] Comparative compound 4: Millad 3988; nucleator manufactured by Milliken & Company
[6] Comparative compound 5: talc (P-6; manufactured by NIPPON TALC Co., Ltd.)
[7] Comparative compound 6: methylene bis (2,4-di-tert-butyl-phenyl)phosphate sodium salt
[8] Comparative compound 7: N,N'-1,4-phenylene bis(benzenesulfonamide)
[9] Comparative compound 8: zinc oxide (one kind; manufactured by MITSUI MINING SMELTING CO., LTD.)
[10] Comparative compound 9: sodium benzoate
[11] Comparative compound 10: Licomont NaV101, nucleator manufactured by Clariant Corporation

TABLE 2

| Test compound | | Semi-crystallization time [sec] | | | |
|---|---|---|---|---|---|
| | | 215° C. | 220° C. | 225° C. | 230° C. |
| Example 2-1 | Compound No. 2 | — | — | 36 | 73 |
| Example 2-2 | Compound No. 9 | — | — | 30 | 58 |
| Example 2-3 | Compound No. 12 | — | — | 38 | 55 |
| Comparative Example 2-1 | Control*[1)] | 98 | 164 | 280 | >600 |
| Comparative Example 2-2 | Comparative compound 5*[6)] | — | 47 | 77 | 139 |
| Comparative Example 2-3 | Comparative compound 10*[11)] | — | 32 | 59 | 119 |

Production Example 2

A polyester resin composition prepared by adding 1 part by mass of each of the test compounds shown in Table 3 below to 100 parts by mass of polyethylene naphthalate resin (TN8065S; manufactured by Teijin Chemicals, Ltd.) was mixed. Then, the resultant resin composition was dried under reduced pressure at 160° C. for 6 hours and kneaded with a single-screw extruder (Labo Plastomill μ; Toyo Seiki Seisaku-sho, Ltd.) at a cylinder temperature of 290° C. and a screw speed of 150 rpm to prepare pellets. The resultant pellets were dried at 140° C. for 3 hours and then evaluated as described below.

(Crystallization Temperature)

The resulting pellets were heated to 290° C. at a rate of 50° C./min, maintained for 10 minutes, and then cooled to 100° C. at a rate of −10° C./min in a differential scanning calorimeter (Diamond; Perkin Elmer Inc.) to determine the crystallization temperature. The results are shown in Table 3 below.

(Semi-Crystallization Time)

The resulting pellets were heated to 290° C. at a rate of 50° C./min, maintained for 10 minutes, and then cooled to 200° C. at a rate of −200° C./min in a differential scanning calorimeter (Diamond; Perkin Elmer Inc.). Then, the temperature of 200° C. was kept for 30 minutes to determine a time required until the quantity of endothermic enthalpy heat reached half the whole heat required for crystallization. The time was considered as the semi-crystallization time. The results are shown in Table 3 below.

TABLE 3

| Test compound | | Crystallization temperature [° C.] | Semi-crystallization time (200° C.) [sec] |
|---|---|---|---|
| Example 3-1 | Compound No. 3 | 216.6 | 49 |
| Comparative Example 3-1 | Control*[1)] | —*[12)] | —*[12)] |
| Comparative Example 3-2 | Comparative compound 5*[6)] | 213.4 | 84 |
| Comparative Example 3-3 | Comparative compound 6*[7)] | 214.1 | 72 |
| Comparative Example 3-4 | Comparative compound 9*[10)] | 201.9 | 105 |

*[12)]unmeasured because an endothermic peak did not appear.

Production Example 3

A polyester resin composition prepared by adding 1 part by mass of each of the test compounds shown in Table 4 below to 100 parts by mass of polybutylene terephthalate resin (300FP; manufactured by WinTech Polymer Ltd.) was mixed. Then, the resultant resin composition was dried under reduced pressure at 140° C. for 3 hours and kneaded with a twin-screw extruder (Labo Plastomill μ; Toyo Seiki Seisaku-sho, Ltd.) at a cylinder temperature of 250° C. and a screw speed of 150 rpm to prepare pellets. The resultant pellets were dried at 140° C. for 3 hours and then evaluated as described below.

(Crystallization Temperature)

The resulting pellets were heated to 250° C. at a rate of 50° C./min, maintained for 10 minutes, and then cooled to 100° C. at a rate of −10° C./min in a nitrogen atmosphere (20 ml/min) in a differential scanning calorimeter (Diamond; Perkin Elmer Inc.) to determine the crystallization temperature. The results are shown in Table 4 below.

TABLE 4

| Test compound | | Crystallization temperature [° C.] |
|---|---|---|
| Example 4-1 | Compound No. 2 | 199.6 |
| Example 4-2 | Compound No. 3 | 203.8 |
| Example 4-3 | Compound No. 5 | 202.9 |
| Comparative Example 4-1 | Control | 194.2 |
| Comparative Example 4-2 | Comparative compound 10*[11)] | 197.1 |

Production Example 4

A resin composition prepared by adding 0.1 part by mass of tetrakis[methylene-3-(3,5-di-tert-butyl-4-hydroxyphenyl)propionate)methane], 0.1 part by mass of tris(2,4-di-tert-butylphenyl)phosphite, 0.1 part by mass of calcium stearate, and 0.1 part by mass of each of the test compounds shown in Table 5 below to 100 parts by mass of polyolefin resin (melt flow value: 10 dg/min, homopolypropylene) was pre-mixed. Then, the resultant resin composition was granulated at 230° C. using 40-mm single-screw extruder to prepare pellets. The crystallization temperatures of the resultant pellets were measured by the method described below.

(Crystallization Temperature)

The resulting pellets were heated to 230° C. at a rate of 50° C./min, maintained for 10 minutes, and then cooled to 100° C. at a rate of −10° C./min in a nitrogen atmosphere (20 ml/min) in a differential scanning calorimeter (Diamond; Perkin Elmer Inc.) to determine the crystallization temperature. The results are shown in Table 5 below.

TABLE 5

| Test compound | | Crystallization temperature [° C.] |
|---|---|---|
| Reference Example 1 | Compound No. 7 | 122.2 |
| Reference Example 2 | Control*[1)] | 115.8 |
| Reference Example 3 | Comparative compound 9*[10)] | 128.8 |

According to the results in Tables 1, 3, and 4, when a known nucleator was added to the polyester resin (Comparative Examples 1-2 to 1-8 in Table 1, Comparative Examples 3-2 to 3-6 in Table 3, and Comparative Example 4-2 in Table 4), the effect of improving the crystallization temperature was not satisfactory. On the other hand, when the sulfonamide compound metal salt according to the present invention was added to the polyester resin (Examples 1-1 to 1-13 in Table 1, Example 3-1 in Table 3, and Examples 4-1 to 4-3 in Table 4), an effect superior to those of existing nucleators was exhibited. In particular, it was confirmed that a sulfonamide compound which is not a metal salt has the significant effect of improving the crystallization temperature of the polyester resin composition (Example 1-1 and Comparative Example 1-4, Example 1-3 and Comparative Example 1-2, and Example 1-13 and Comparative Example 1-8). Since an improvement of the crystallization temperature contributes to an improvement of the heat distortion temperature of a molded product produced by molding the polyester resin, the molded product can be used in a desired high-temperature region.

In addition, the results in Tables 2 and 3 confirmed that the polyester resin composition using the sulfonamide compound metal salt has a significantly shortened time required for crystallization, and the polyester resin composition according to the present invention is an excellent resin composition having good moldability (Examples 2-1 to 2-3 and Example 3-1).

Further, the results in Table 5 indicate that even when a sulfonamide compound metal salt is used for an olefin resin (Reference Example 1), an excellent effect is not exhibited as compared with a known nucleator (Reference Example 3), and thus the sulfonamide compound metal salt of the present invention exhibits a particularly significant effect only on the polyester resin.

Therefore, the present invention exhibits the effect of producing a polyester resin composition having a high crystallization temperature and excellent promotion of crystallization by using a sulfonamide compound metal salt for the polyester resin composition. Further, an increase in crystallization temperature of the polyester resin composition of the present invention can contribute to an increase in heat distortion temperature of a molded product produced by molding the polyester resin composition.

The invention claimed is:

1. A polyester resin composition comprising (a) a polyester resin containing (b) a sulfonamide compound metal salt which has a structure selected from groups of the following general formulae (1), (2) and (3):

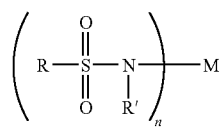
(1)

(in the formula (1), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; n represents a number of 1 or 2;

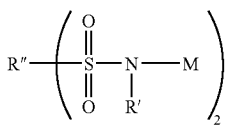
(2)

(in the formula (2), R' has the same meaning as in the formula (1), and R'' represents a linking group which may be substituted (an alkylene group having 1 to 12 carbon atoms, an alkenylene group having 2 to 12 carbon atoms, a cycloalkylene group having 3 to 8 carbon atoms, an alkylene group having an ether bond and 4 to 20 carbon atoms, an alkylene group interrupted by a cycloalkylene group and having 5 to 20 carbon atoms, an arylene group having 6 to 12 carbon atoms, or a combination thereof)), and,

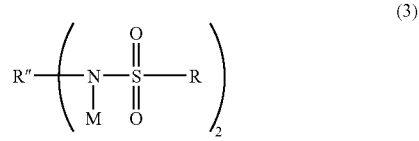
(3)

(in the formula (3), R has the same meaning as in the formula (1), and R'' has the same meaning as in the formula (2)), and wherein M in the general formulae (1), (2) and (3) is an alkali metal atom;

wherein the polyester resin (a) is selected from the group consisting of polyethylene terephthalate (PET), polyethylene naphthalate (PEN) and polybutylene terephthalate (PBT); and, wherein the sulfonamide compound metal salt (b) is mixed in an amount of 0.01 to 10 parts by mass relative to 100 parts by mass of the polyester resin (a).

2. The polyester resin composition according to claim 1, wherein the sulfonamide compound metal salt (b) has a structure represented by the following general formula (4):

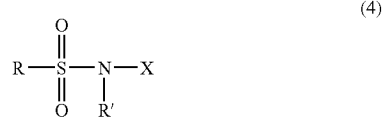
(4)

(in the formula (4), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; and X represents an alkali metal atom).

3. The polyester resin composition according to claim 1, wherein the sulfonamide compound metal salt (b) has a structure represented by the following general formula (5):

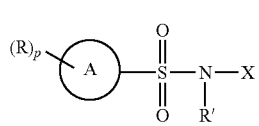
(5)

(in the formula (5), ring A represents a cyclic group having 3 to 30 carbon atoms, R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; X represents an alkali metal atom; p represents an integer of 0 to 3; and when p is an integer of 2 or more, a plurality of R may be different from each other).

4. The polyester resin composition according to claim 1, wherein the sulfonamide compound metal salt (b) has a structure represented by the following general formula (6):

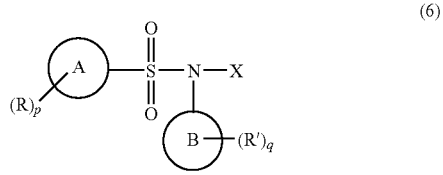

(6)

(in the formula (6), rings A and B each independently represent a cyclic group having 3 to 30 carbon atoms, R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; X represents an alkali metal atom, p represents an integer of 0 to 3; when p is 2 or more, a plurality of R may be different from each other; q represents an integer of 0 to 3; and when q is 2 or more, a plurality of R' may be different from each other).

5. The polyester resin composition according to claim 1, wherein the sulfonamide compound metal salt (b) has a structure represented by the following general formula (7):

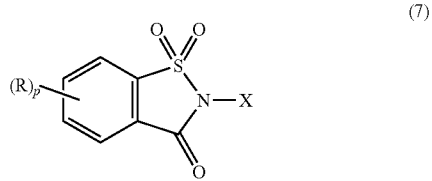

(7)

(in the formula (7), R represents a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; X represents an alkali metal atom; p represents an integer of 0 to 3; and when p is 2 or more, a plurality of R may be different from each other).

6. A polyester resin composition comprising (a) a polyester resin containing (b) a sulfonamide compound metal salt which has a structure represented by the following general formula (8):

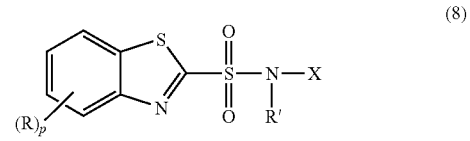

(8)

(in the formula (8), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; X represents an alkali metal atom; p represents an integer of 0 to 3; and when p is 2 or more, a plurality of R may be different from each other);
wherein the polyester resin (a) is selected from the group consisting of polyethylene terephthalate (PET), polyethylene naphthalate (PEN) and polybutylene terephthalate (PBT); and,
wherein the sulfonamide compound metal salt (b) is mixed in an amount of 0.01 to 10 parts by mass relative to 100 parts by mass of the polyester resin (a).

7. The polyester resin composition according to claim 1, wherein the sulfonamide compound metal salt (b) has a structure represented by the following general formula (9):

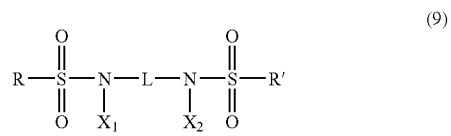

(9)

(in the formula (9), R and R' each independently represent a hydrogen atom, a halogen atom, an alkali metal atom, an amino group, an alkyl group which has 1 to 10 carbon atoms and which may be branched or substituted, an alkoxy group which has 1 to 10 carbon atoms and which may be branched or substituted, or a cyclic group which has 3 to 30 carbon atoms and which may be substituted; R and R' may be bonded together to form a cyclic group; X1 and X2 each independently represent an alkali metal atom; and L represents a linking group (an alkylene group having 1 to 12 carbon atoms, an alkenylene group having 2 to 12 carbon atoms, a cycloalkylene group having 3 to 8 carbon atoms, an alkylene group having an ether bond and a total of 4 to 20 carbon atoms, an alkylene group interrupted by a cycloalkylene group and having a total of 5 to 20 carbon atoms, or an arylene group having 6 to 12 carbon atoms)).

8. The polyester resin composition according to claim 1, wherein M in the general formulae (1), (2) and (3) is a sodium atom.

9. The polyester resin composition according to claim 8, wherein the polyester resin (a) is polyethylene terephthalate.

* * * * *